United States Patent [19]

Connolly et al.

[11] Patent Number: 4,937,693
[45] Date of Patent: Jun. 26, 1990

[54] STAGGERED HEADS FOR MINIMIZING DISK SPACING IN A DISK DRIVE

[75] Inventors: Richard P. Connolly; Mark D. Mastache, both of Boise, Id.

[73] Assignee: Hewlett-Packard Company, Palo Alto, Calif.

[21] Appl. No.: 260,846

[22] Filed: Oct. 20, 1988

[51] Int. Cl.⁵ .................. G11B 21/08; G11B 21/22; G11B 5/54; G11B 5/55
[52] U.S. Cl. .................................. 360/106; 360/104
[58] Field of Search ........................... 360/104, 106

[56] References Cited

U.S. PATENT DOCUMENTS 4,800,455  1/1989  Takizawa ........................ 360/106
4,843,503  6/1989  Hazebrouck et al. .......... 360/106

Primary Examiner—Robert S. Tupper

[57] ABSTRACT

A disk drive is provided in which the arm/head structures of the armstack are mounted in circumferentially spaced pairs, on individual projections of a rotatable actuator. The mounted pairs of arm/head structures project between the confronting disk surfaces of adjacent disks with the heads displaced from one another in a direction longitudinally of the arms and with the active faces of the heads pointing in opposite directions and in confronting or yielding contact with an adjacent disk surface. The magnetic heads are at different radial locations on respective confronting surfaces of adjacent disks of the disk stack as the actuator rotates, in all radial track positions except one track position.

2 Claims, 3 Drawing Sheets

STAGGERED HEADS FOR MINIMIZING DISK SPACING IN A DISK DRIVE

BACKGROUND OF THE INVENTION

1. Field of the Invention

This invention relates generally to disk memory drives and particularly to disk drives having increased storage capacity because of reduction in disk spacing to increase the number of disks in a given disk stack height.

2. Description of the Prior Art

Higher disk memory storage capacities are being required in applications in which increased disk memory space or volume is not available. Increasing the track density is not a presently viable approach to increasing the memory storage capacity because of problems encountered in reducing the size of the recording elements of magnetic heads, both from the point of view of magnetic head fabrication and magnetic flux control during the recording of the servo and data fields.

Efforts to meet the need for increased data storage in limited or reduced space in disk drives, have resulted in designs in which the axial spacing of the memory disks is being reduced. There are physical limits to size reductions in magnetic heads, as noted above, while still retaining functional utility and reliability. There are also physical limits to size reductions in the arms of armstacks which carry the magnetic heads and in their attachment supports, while still maintaining the arm strength and arm stability required to properly move and position the heads. The result is that clearance between the armstack structure projecting between the adjacent disks and the surfaces of these disks is reduced.

In presently known prior art disk/armstack designs in disk drives, the arms of the armstack and the heads are stacked in vertical alignment. Reductions in the space between the surfaces of the disk to 0.120 inches and less, negate the use of such an armstack design. Even if the heads and arms could be fitted between the disk surfaces in vertically aligned positions, the spacing would be too close to be practical. Shock forces due to handling could easily damage disk surfaces, and slight abnormalities in the roll or pitch attitudes of the head in flight, or in elevation of the head above the disk surface, could cause collision between stacked head supports at their extremities and head crashes on disk surfaces, with catastrophic results.

SUMMARY OF THE INVENTION

The problem discussed above is addressed by this invention and is solved in a disk drive having a new and improved armstack/head structural configuration, using existing arms and magnetic heads, in pairs, in staggered circumferential positions, permitting a reduction in disk spacing. This new head placement does not complicate track seeking functions or track recording or reading functions. This armstack structure comprises individual flexible arm sections, carrying magnetic heads, fitted between the confronting surfaces of adjacent disks. The arm sections each comprise a pair of flexible arms, each arm carrying a head at one extremity. The pairs of arms are mounted in circumferentially spaced relationship as viewed in plan on individual plates or teeth of a comb attached to the actuator.

In a presently preferred embodiment of this invention, the flexible arms called "flexures" are of shallow channel cross section, tapering from a wide flat base attached to a comb plate to a narrow tip. The individual heads are flexibly mounted at these tips for limited angular movement about each of roll and pitch axes. The shallow channel section extends only over the tapered portion of the flexure, not including the flat base. The active faces of the heads which scan the disks are oppositely disposed, one facing up and the other facing down, each to seat upon the confronting disk surface. The heads are also disposed in side-by-side relationship.

In a disk drive having a linear actuator for the armstack, the longitudinal axes of the heads may be aligned in plan view. Alternatively, they may be slightly skewed in plan view to each lie on the tangent of selected corresponding tracks thereat in the respective disk surfaces, say the center track of each disk, between the outer and inner tracks. In applications where the disks are provided with servo gaps having indexes and track numbers, the heads need not be aligned as shown, but may be offset longitudinally of the armstack. The use of track numbers in track seeking eliminates a need for head alignment since the servo moves the head to seek a track number. The extent of such head displacement is controlled by the physical limits imposed by the geometry of the drive.

In a disk drive having a rotary actuator, the longitudinal axes of the heads are displaced from one another in a direction longitudinally of the armstack. In such an armstack configuration, there is only one track on which the longitudinal axes of the heads can be simultaneously centered, and the amount of longitudinal displacement of one head with respect to the other depends upon which track is selected. In this instance, the outer track of the respective disks is selected. Where a disk having track numbers in the servo gap is employed, as discussed for the linear actuator, the heads may be positioned over different tracks, within physical limitations imposed by the geometry of the drive.

Other features of this invention together with their advantages will become apparent from a study of the following specification when considered in conjunction with the accompanying drawings, in which:

DESCRIPTION OF THE PREFERRED EMBODIMENT

Figure 1:
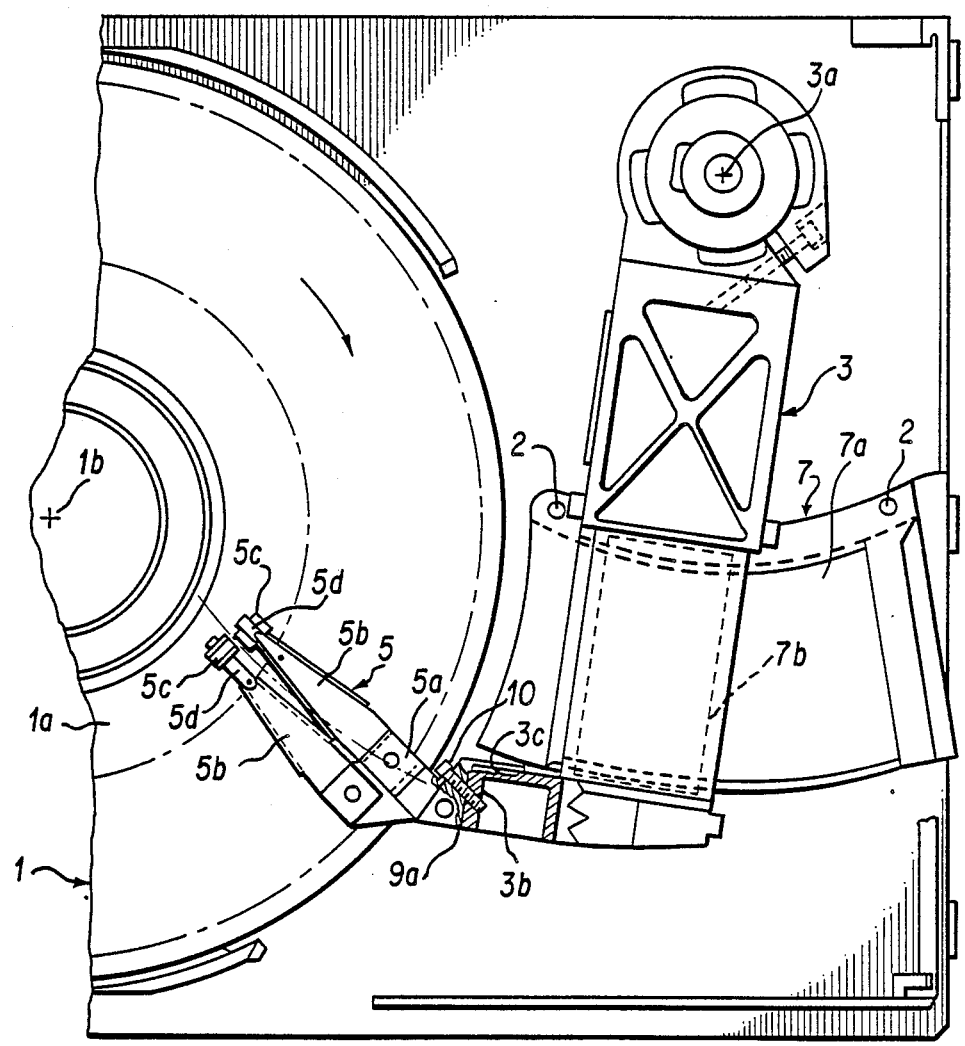
FIG. 1 is a plan view of a presently preferred embodiment of this invention showing the improved armstack structure on a rotary actuator type of disk memory drive.

Referring to the plan view of this invention illustrated in FIG. 1, which is the presently preferred embodiment of this invention, there is illustrated a disk memory drive of the rotary actuator type comprising a magnetic disk assembly 1 adapted to be driven by a motor (not shown). A plurality of disks 1a are typically mounted in uniformly axially spaced positions along a spindle which is journalled to rotate about a central axis 1b.

The actuator 3, which is of the rotary actuator type, is journalled to rotate about an axis 3a. The angular position of the actuator between limit stops 2 is controlled by an electromagnetic drive generally designated 7 which comprises a permanent magnet structure having an arcuate center pole 7a, the magnetic field of which links a coil 7b carried by the rotary actuator 3 and which surrounds the center pole 7a. The center pole 7a is arcuate, as seen, having its arc center at the axis 3a. A servo system including a programmable microprocessor (not shown) provides controlled power for the coil 7b to move the actuator between selected angular positions, for track seeking and track following purposes as commanded by the microprocessor. As seen, the actuator 3 is mounted in a position beside the magnetic disk stack so that its free end swings toward and away from the disk stack.

A lateral projection or arm 3b on the free end of the rotary actuator 3 projects towards the disks. This lateral arm 3b forms part of a comb structure 5a which mounts the armstack 5. The comb structure 5a comprises individual flexure mounting plates 9, FIGS. 1, 3 and 4, in which FIGS. 3 and 4 are drawn to an enlarged scale with respect to FIG. 1. Note is made here, that FIGS. 3 and 4 are plan and side views of the armstack 5 of the linear actuator disk drive of FIG. 2; however, they differ only in slight design detail from FIG. 1 and reference thereto in this description of the rotary actuator armstack does not involve such detail. These individual flexure mounting plates 9 comprise the teeth of the comb structure 5a. These flexure mounting plates 9 have base portions 9a which are individually fitted into uniformly spaced slots 3c, FIG. 1 and FIG. 4, in the lateral arm 3b of the actuator 3. One or more screws 10 in each flexure mounting plate 9 secures the flexure mounting plate to the lateral arm 3b. The spacing of the slots 3c is such that a line through the center of a flexure mounting plate 9, as viewed edgewise, see FIG. 4, is centered between the disks 1a. A projecting plate section 9c on each flexure mounting plate 9, having upper and lower faces 9d and 9e, equally spaced about a central axis, or central plane, of the flexure mounting plate, provides mounting surfaces for the flexures 5b. As seen in FIG. 4, one flexure 5b is mounted on the face 9e on the bottom side of the plate section 9c, and the other of the two flexures 5b, seen in FIG. 4, is mounted on the top side of the plate section 9c on the surface 9d. They are in circumferentially spaced relationship, as viewed in FIGS. 3 and 1. The flexure on the upper face 9d is bent downwardly and the flexure on the lower face 9e is bent upwardly. As seen in the side view, FIG. 4, they cross at about their mid-length positions.

Magnetic heads 5c are mounted on the ends of the flexures 5b by means of flat springs 5d of light weight construction. As seen in plan view, FIGS. 1 and 3, they are circumferentially spaced with respect to the disk. It will be observed from FIGS. 1, 3 and 4, that the magnetic head 5c on the downwardly bent flexure 5b faces downwardly and the magnetic head 5c on the upwardly bent flexure 5b faces upwardly. In these positions, the active faces of the magnetic heads are gently biased against the confronting surfaces of the adjacent disks between which they are fitted. The flexures 5b are shallow channels. The channel sections extend over the tapered portions of the flexures but do not extend into the area where the flexures are mounted, thus providing flexibility of the flexures adjacent the mounting pad or surfaces 9d and 9e. A head plate 5e and a center hole attachment such as a rivet or screw 5f, secures each flexure to its mounting surface 9d or 9e on the plate section 9c.

This staggered structure of heads and flexures eliminates the possibility of collision between the adjacent flexures and their heads, and the collision of the free end of a flexure with a disk, due either to shock forces experienced in normal handling or in typical inflight forces acting on the heads and flexures during disk drive operation.

The magnetic heads are also relatively longitudinally displaced of the armstack, as seen in FIG. 1. Unlike the linear actuator disk drive of FIG. 2, the rotary actuator disk drive of FIG. 1 does not move the heads over a radial line, but rather along a shallow arc defining two points on a radial line where the arc intercepts the outer and inner tracks. With the rotary actuator, there is only one track where the heads can be aligned or centered on a single track. For all other track locations the heads are at different radial positions on the respective confronting surfaces of the adjacent disks. For the head position shown, the outer track is the selected track on the respective disks. Corrections for head/track positions when selecting one or the other of the heads for recording or reading are progressive from this outer track inwardly on each disk and are easily programmed in a microprocessor forming part of the disk drive servo system. The circumferential displacement of the heads, as shown in plan view, poses no problems with respect to the servo system, since an index mark is provided in each track which together with a sector mark identification in each servo gap of a track, provides timing with respect to the recording or reading of data. A track number provided in each servo gap in each track facilitates track seeking.

As seen in FIG. 1, angular movement of the actuator 3 is limited between the fixed stops 2 which are secured in the permanent magnet structure 7. Between these extremes of positions, track seeking and track following operations of the disk drive take place.

Figure 2:
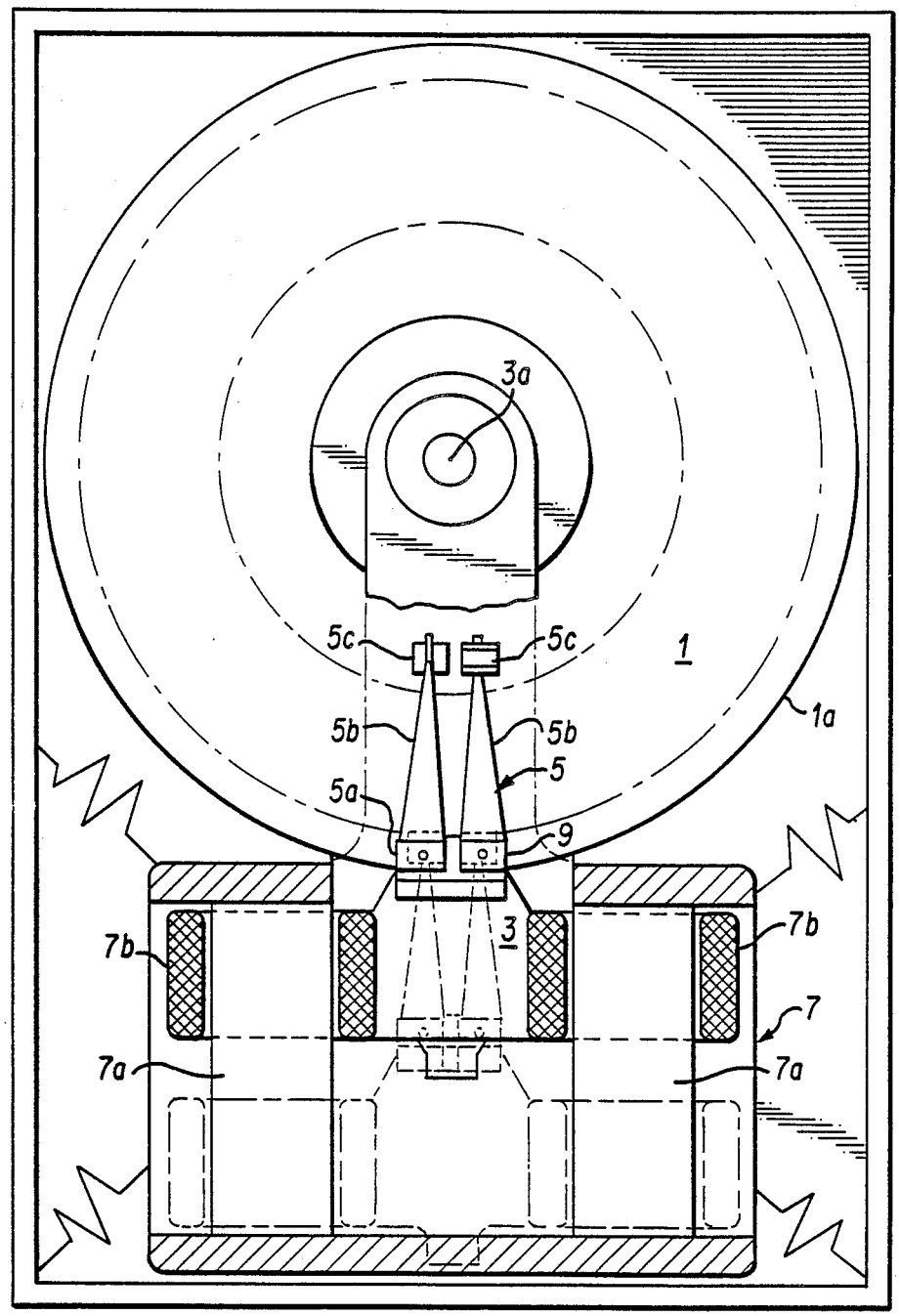
FIG. 2 is a plan view of another preferred embodiment of this invention showing the improved armstack structure in a linear actuator type of disk memory drive.
Figure 3:
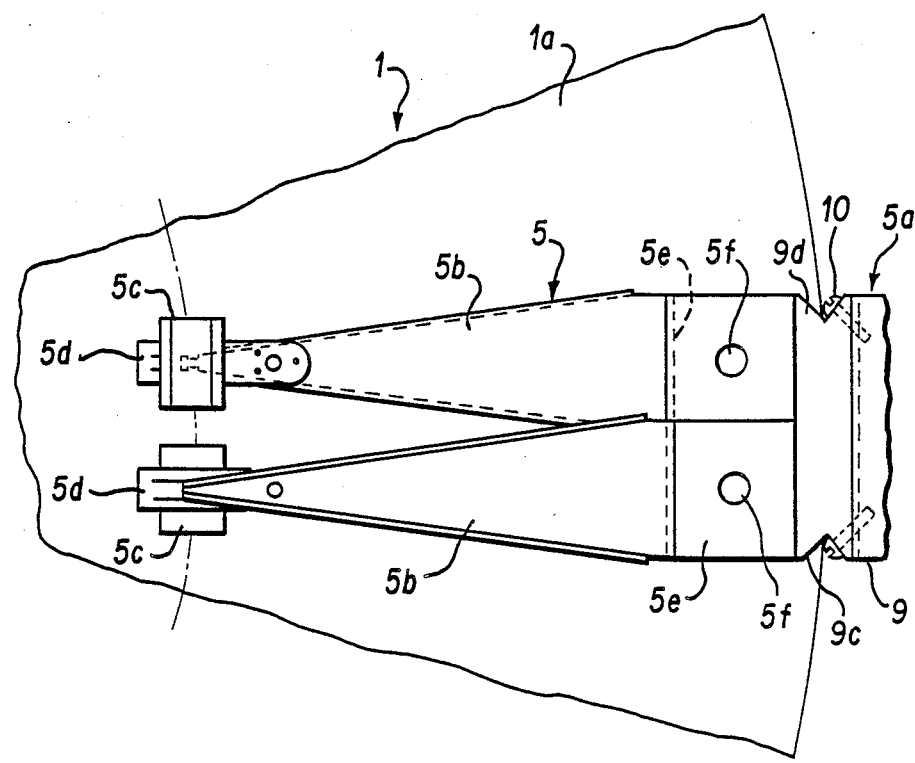
FIGS. 3 and 4 are respectively enlarged fragmentary plan and side views of the armstack structure, showing the side-by-side relationship of the individual arms and heads of the improved armstack structure.
Figure 4:
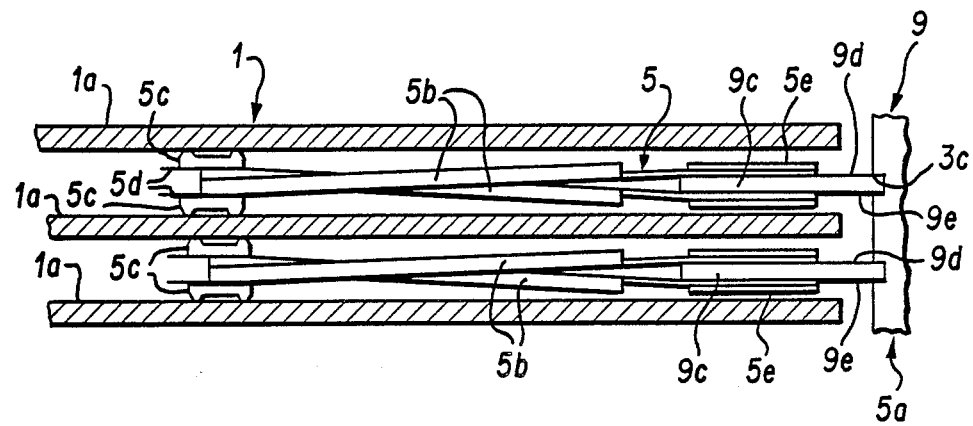

The application of this invention to a linear actuator type of disk drive is seen in FIGS. 2, 3 and 4. In these figures, parts having a function corresponding to parts of FIG. 1 bear like reference characters.

The linear electromagnetic driver 7 comprises a pair of linear center poles 7a which are equally spaced on opposite sides of the central axis of movement of the actuator. A pair of coils 7b are provided on the linearly movable actuator, each of which surrounds one of the center poles 7a. The armstack structure 5 is mounted on the comb structure 5a on the end of the actuator 3 facing the disk stack 1. The flexures 5b are disposed in circumferentially spaced positions with respect to the disk in plan view, with their base ends secured to the individual flexure mounting members 9 of the comb structure 5a. The magnetic heads 5c are mounted in circumferentially spaced positions with respect to the disks, on the ends of the flexures 5b. This mounting is the same as that described in connection with FIG. 1.

FIGS. 3 and 4 show enlarged plan and side views of the armstack 5 of FIG. 2. The side view of FIG. 4 illustrates only two sections of the armstack structure, typically comprising seven such sections for a disk stack of eight disks. The arms for the top surface of the top disk and for the bottom surface of the bottom disk each comprise only a single flexure and a single head. They are not shown, being of no interest to this invention. The flexures and magnetic heads of these two sections which are illustrated are positioned between three of the disks 1a. In FIG. 3, as in FIGS. 1 and 2, the uppermost disk has been removed so that a plan view of the armstack structure may be better illustrated.

The central axis of the linear actuator lies in a position between the heads 5c which corresponds to a radius of the disk. Thus, there is no need for offset between the heads along the armstack axis, and the longitudinal axes of the heads, as viewed in plan, may be aligned in positions normal to the central axis of the actuator to simultaneously center on corresponding tracks in the surfaces of adjacent disks. In the alternative, the heads may be skewed slightly with respect to each other so that each longitudinal axis is tangent to a track arc of its adjacent disk surface at that head location. The thickness of the plate section 9c of the flexure mounting plate 9 together with the thickness of each of the head plates 5e, is easily controlled, while maintaining structural integrity, so that there is no interference between the surfaces of headplate 5e and mounting rivets or screws 5f, securing the flexure bases to the extension 9c, and the adjacent surface of one of the disks.

Although specific structural details have been disclosed herein, it will be appreciated that the armstack may be fabricated as an assembled unit with the lateral arm 3b, if the lateral arm is detachable from the actuator. By this expedient, the armstack 5 may be assembled or serviced separately from the actuator 3. The flexures 5b may be inverted from the positions shown on their mounting faces 9d and 9e without relocating the heads on the flexure extremities. This inverts the heads from their present positions to engage opposite disk surfaces.

The flexure mounting plate section 9c may be a single piece or two piece construction with the mounting faces 9d and 9e lying in the same plane. These and other structural variations may be practiced using the staggered head construction disclosed.

What is claimed is:

1. A disk memory drive, comprising:
   a. a rotatable memory disk stack;
   b. an actuator arm;
   c. means rotatably mounting said actuator arm;
   d. a comb having plates projecting from said actuator arm;
   e. two flexures mounted in circumferentially spaced positions on each comb plate, and respectively projecting between adjacent pairs of disks; and
   f. a magnetic head mounted on a free end of each flexure so that the magnetic heads are displaced longitudinally of said flexures from each other and circumferentially spaced from each other, the face of one magnetic head engaging the adjacent surface of one of the adjacent magnetic disks of the disk stack at a radial position which is different from the radial position in which the face of the other magnetic head engages the adjacent surface of the other of the adjacent magnetic disks, in all radial track positions of said magnetic heads except one track position.
2. The invention according to claim 1, in which:
   a. said one track position is an outer track.

* * * * *